Aug. 8, 1950         J. G. MACKECHNIE, JR         2,518,037
DROP MECHANISM FOR ARTICLE SORTING APPARATUS
Filed April 2, 1948                                2 Sheets-Sheet 1
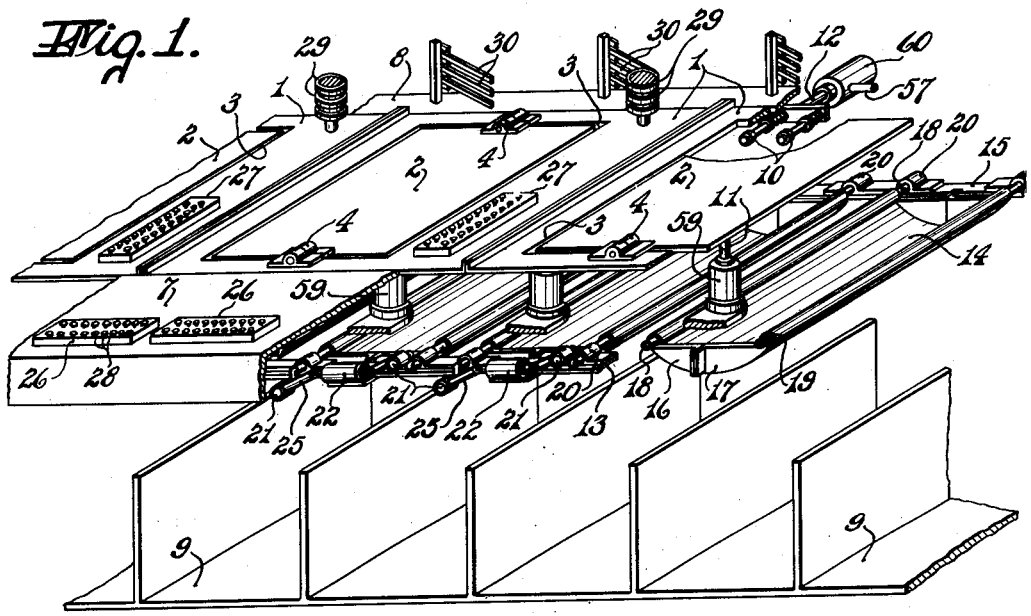
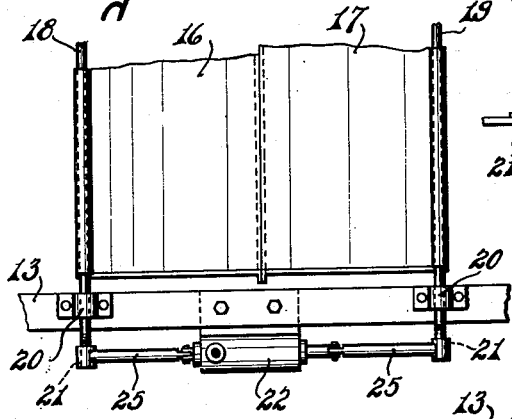
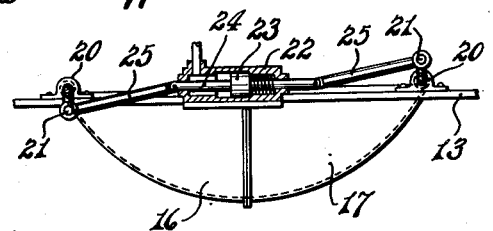
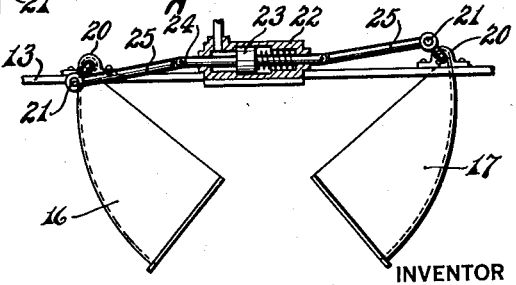
INVENTOR
JAMES G. MACKECHNIE JR.
BY
Chapin & Neal
ATTORNEYS

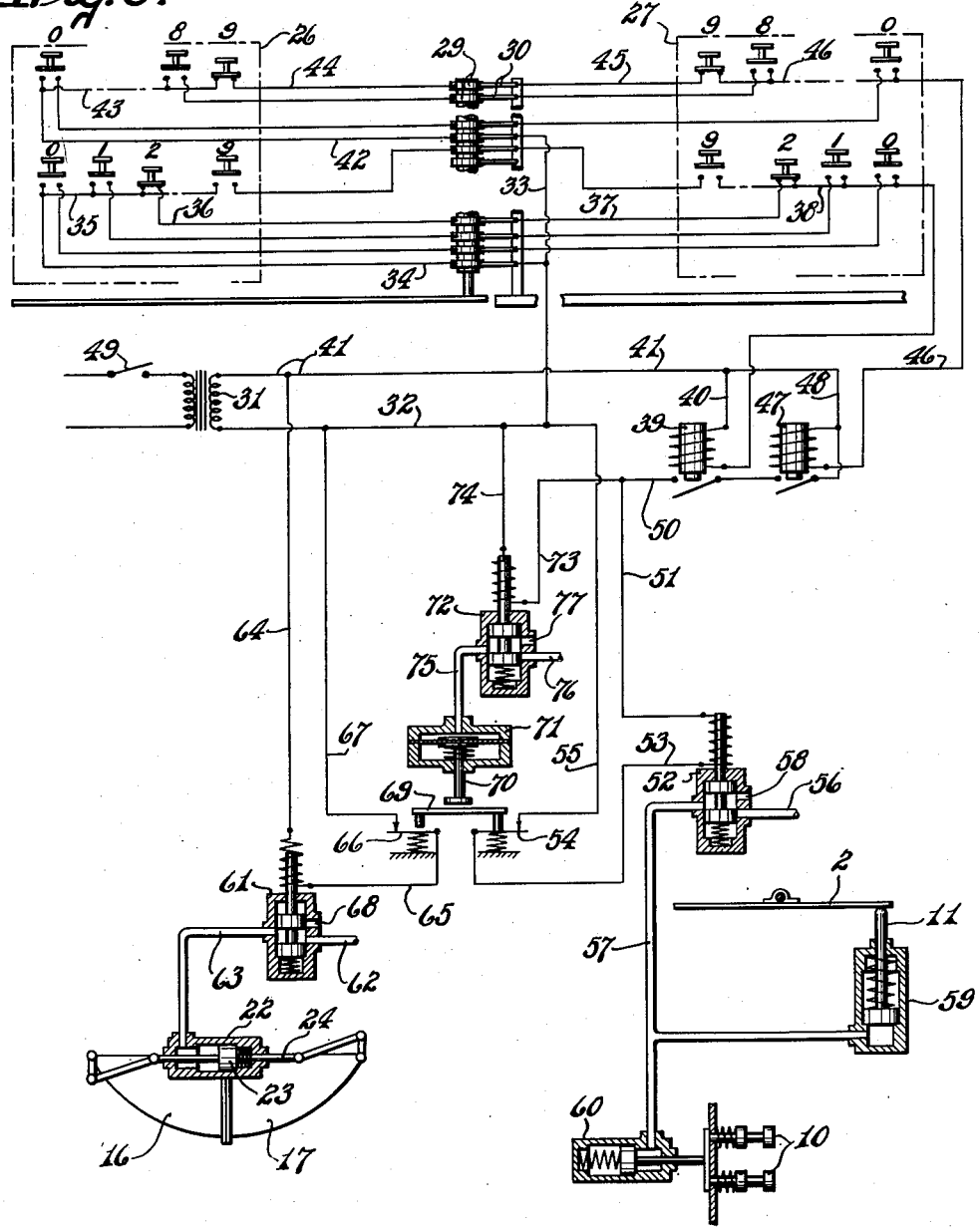

Patented Aug. 8, 1950

2,518,037

UNITED STATES PATENT OFFICE 2,518,037

DROP MECHANISM FOR ARTICLE SORTING APPARATUS

James G. Mackechnie, Jr., Springfield, Mass.

Application April 2, 1948, Serial No. 18,513

1 Claim. (Cl. 214—11)

This invention relates to a selectively controlled sorting apparatus and has for a particular object an improved structure for dropping articles into receiving bins or at collecting stations beneath the article conveying means of the apparatus.

The general type of article sorting machine to which my invention is directed is shown by my Patent No. 2,490,071 for "Laundry Sorting Apparatus." The machine, as shown therein, embodies a tilting mechanism on the conveying means for depositing an article at a preselected collecting station.

While machines of this type are satisfactory for the purpose of sorting a variety of items a special problem arises in the handling of laundered and ironed articles which decreases the practicability of the machine for all usages. In the case of laundered articles which are pressed or ironed ready for packaging to the customer, the collapsible nature of such items requires careful handling to avoid wrinkling or bunching. It has been found that many ironed articles will become more or less crumpled and wrinkled when deposited by sliding from a tilted surface and permitted to fall edgewise for any distance into a bin or on a flat surface. The article slides and drops at an angle. It may in some instances become completely spoiled in appearance.

It is an object of this invention to overcome the difficulty in handling collapsible articles such as pieces of finished laundry in a sorting machine of this type. To this end mechanism is provided in the machine to receive each article from the tilting depositing means, to hold it in position for a straight vertical drop into a receiving bin, and then to drop the same flatwise so that, as the articles are received they will be dropped to form a neat stacked pile for easy handling and packaging.

How my invention accomplishes the desired result will be readily appreciated from a consideration of the following disclosure in connection with the accompanying drawings, in which, Fig. 1 is a perspective view of a section of an article sorting machine embodying the new structure, supporting structure and various parts being cut away;

Fig. 2 is a plan view with portions cut away of an article dropping pan;

Fig. 3 is an end view of the same in article retaining position;

Fig. 4 is a view similar to Fig. 3 with the pan in releasing position; and

Fig. 5 is a diagram of the electrical circuits and pneumatic mechanism controlled thereby for automatic operation of the depositing mechanism.

The conveying means of the sorting apparatus, a section of which is partially illustrated by Fig. 1, comprises a series of carriers 1, on an endless track each having a tray 2 in an opening 3 of the carrier. Each tray is pivoted centrally at opposite sides of the opening as at 4. The carriers are supported on rollers between a side table 7 and an inner shelf member 8, the carriers being in successive order for travel in a predetermined path over a row of collecting bins 9. The rollers are fixed to the facing edges of the table and shelf, those of the table (not shown) extending only under the adjacent edge of the carrier. Similar rollers (not shown) on the shelf support the carrier edge adjacent thereto. In addition, the shelf 8 is provided with retractable rollers 10 which normally extend underneath the edge of a tray 2 to prevent the latter from accidental tipping in its advance along the path of travel.

Forward motion of the carriers is intermittent and supplied by any suitable means which will push the line of carriers in a step by step advance. Reference is made to my aforesaid application for a complete disclosure of the conveying mechanism and for an example of an intermittent drive, the latter being a reciprocating pusher arm located in the line of travel so that each carrier in the line is pushed along by the one following it. Only those portions of the machine necessary for the complete understanding of the present invention are shown by Fig. 1.

Means for tilting a carrier tray to dump an article placed thereon at a preselected bin station comprises a pneumatically operated tipping plunger 11 to raise the forward edge of a tray 2 and a retracting plunger 12 to withdraw the retractable rollers 10 from under the tray. When said means are actuated, the tray 2 is centrally pivoted as at points 4 to slide an article off the tray.

As will be noted by consideration of Fig. 1, an article previously placed on a tilted tray 2 will slide into a drop pan 14 mounted between two strap supports 13 and 15. Each bin is provided with a drop pan 14 mounted directly above it. Said pan 14 comprises two side portions 16 and 17 mounted on the outer edges thereof on pintles 18 and 19 respectively. The pintles are journaled in brackets 20 on supports 13 and 15. The outer ends of pintles 18 and 19 extend beyond strap 13 and are in the form of crank arms with handles 21 for connection with a cranking device for pivoting action of said side portions.

As shown by Figs. 3 and 4 a cylinder 22 with a spring pressed piston 23 and rod 24 is mounted on support 13. The piston is normally urged to the left causing a corresponding movement of two throw arms 25 connected to said rod 24 at each end thereof. Said throw arms 25 are pivotally connected to the crank handle ends 21 of the pintles 18 and 19. As noted in Fig. 3 the piston 23 is represented as being under pressure and compressing the spring, thereby establishing an article retaining position of the drop pan 14. In Fig. 4 release of the pressure has caused the spring to move the piston and swing the side portions 16 and 17 to article releasing position.

The selective control apparatus for operation of the machine includes a series of presettable push button switch boxes 26, mounted on table 7. Each box 26 is associated with a particular bin to preset the tilting mechanism at the bin for operation of trays on preselected carriers. On each carrier 1 is mounted a presettable push button switch box 27 similar to switch box 26. As will become apparent, each box 26 and 27 controls a group of corresponding partial electric circuits. In the operation of the machine an operator presets a switch box 26 for the collection of a particular customer's laundry in one of the bins. Then as an item belonging to that customer is placed on a tray by the operator, the switch box 27 of the carrier is preset to correspond with the setting on the bin box 26 for the tilting of the tray at the appropriate bin.

Each partial circuit of the group in a switch box 26 and associated with a particular bin may be set up by operation of push button keys 28 as will be readily understood. Similarly, each switch box 27 controls a group of partial electric circuits associated with a particular carrier and any of these latter circuits may be preset by the keys to correspond with any given preset bin circuit.

Completion of the partial circuits preset by the keys of a bin switch box 26 is made through the arrival of a preselected carrier at a bin station with said carrier switch box 27 having corresponding partial circuits preset by its keys. The partial circuits thus joined will cause an article on a tray to be deposited at that bin station. Positional switch means for the purpose of establishing the desired circuits include distributor contacts 29 mounted on the forward inner edge of a carrier 1 and distributor contacts 30 mounted on shelf 8 in the path of the moving carrier-mounted contacts 29.

In Fig. 5 a wiring diagram is shown of the electric circuits and the connections for actuating the pneumatic mechanism employed to deposit the article in a bin. The group of partial circuits associated with the carriers are located at the left in the diagram; the group of circuits corresponding thereto and associated with the bin mechanism are at the right. Assuming a row of ten keys the top row thereof may be assigned numbers from zero to ten and represent a unit value. The bottom row, similarly assigned numbers, may represent a decimal value. Thus various circuits numbered from 00 to 99 can be preset by the keys.

As illustrated in the diagram of Fig. 5 appropriate keys have been depressed to set up partial circuits representing the number 29 on each switch box and the contacts 29 and 30 are shown as joined by the arrival of the carrier at the bin station. A circuit is thus established from a source 31, through connecting wires 32 and 33, contacts 30 and 29, wires 34 and 35, switch of decimal number 2 of the carrier switch box 27, wire 36, contacts 29 and 30, wire 37, switch of decimal number 2 of bin switch box 26, wire 38, solenoid 39, wires 40 and 41 back to source 31 through line switch 49. This circuit will energize the solenoid 39.

The second circuit with key number 9 is also completed through wires 32, 33, contacts 30 and 29, wires 42, 43, switch of unit number 9 of bin switch box 27, wire 44, contacts 29 and 30, wire 45, switch of unit number 9 of carrier switch box 26, wire 46, solenoid 47, wires 48 and 41 back to source 31 through line switch 49. This circuit will energize solenoid 47.

It will be readily appreciated that unless corresponding switches in the two boxes 26 and 27 are closed by the keys either one or the other or both of the solenoids 39 and 47 will remain deenergized. If both solenoids are energized, as will occur as shown by Fig. 5 upon the closing of line switch 49, the switches associated with the solenoids will be closed to energize operative mechanism to be described. In the event a third or fourth row of numbered keys controlling additional partial circuits are desired additional solenoid switches similar to 39 and 47 may be set up to be controlled thereby. Thus a greater numeral selectivity can be supplied if desired for any purpose. And unless all such solenoid switches are closed by the selective key mechanism the operative structure will not then be energized.

Upon closing the switches of solenoids 39 and 47, a circuit is established through wires 41, 48, 50 and 51, solenoid valve 52, wire 53, breaker switch 54, and wires 55 and 32. This circuit will energize solenoid valve 52 controlling a source of air under pressure in a pneumatic supply line 56. When energized the valve will be opened against spring pressure to permit air pressure in outlet line 57, blocking off exhaust port 58. As shown outlet 57 supplies air to a spring pressed valve 59 thereby extending plunger 11 to tip the tray 2. Simultaneously, air is admitted to a valve 60 which simultaneously retracts the rollers 10 through a plunger 12 and permits the pivoted tilting of tray 2 by plunger 11.

As an article on the tray is tilted it slides into the drop pan 14 previously described. The drop pan is normally in article retaining position, as shown by Fig. 5, and is so held by a normally energized solenoid valve 61 which admits air under pressure from an inlet line 62 to an outlet 63 leading to cylinder 22. The solenoid valve 61 is connected in the circuit to wire 41 by a connector 64, and to wire 32 by a wire 65, breaker switch 66, and connector 67.

In order to deenergize solenoid valve 61 and permit release of air from cylinder 22 through an exhaust port 68 of valve 61, and thereby pivot the sides of the drop pan to open position, a breaker switch mechanism is provided. Said mechanism includes an arm 69 having a lost motion connection with a stem 70 of a pneumatically operated spring held diaphragm 71. A solenoid valve 72 controls operation of diaphragm 71, by admitting air under pressure into a pressure line 75 through a valve inlet 76. The pressure is relieved through an exhaust port 77. Solenoid valve 72 is energized simultaneously with solenoid 52 associated with the tilting apparatus. The circuit is through wire 50, connector 73, solenoid 72, connector 74, and circuit wire 32.

In operation a carrier 1 arrives at a bin station into which an article on the tray is to be deposited. The contacts 29 and 30 energize the appropriate preset circuits to solenoid valves 52 and 72. Valve 52 causes the tray to be tilted and the article slides into the drop pan. Retraction of the plunger 11 and removal thereof from the path of the tilted tray is desired as the carrier and tray will soon again be moved forward. Valve 72 thus causes the timed operation of the breaker switch 54, through the delay and lost motion of the diaphragm device. Switch 54 when opened deenergizes solenoid 52 and the plunger 11 is retracted. Valve 72 also by timed operation of breaker switch 66 deenergizes solenoid 61 and permits operation of the drop pan by pivoting the sides thereof. An article thus drops vertically into the bin. As the carrier moves forward, the circuit to solenoid 72 is interrupted by separation of contacts 29 and 30 and the parts return to normal position.

It will be seen from a consideration of the structure as disclosed herein that flat laundered items tilted from the conveyor mechanism will slide rearwardly into the drop pan which is slightly offset from the carrier stopping station as shown by Fig. 1. The pan having a concave shallow trough-like cross section will cradle a collapsible article in a more or less horizontal flatwise position. When the side portions are pivoted from the position of Fig. 3 to that of Fig. 4 the article will be dropped vertically to rest flatwise in the bottom of a bin. As the articles are dropped into a bin by the successive operation of selected carriers they will be stacked one on top of another to form a pile which can be easily handled for packaging.

The straight vertical dropping of an article into a bin eliminates the crumpling and wrinkling of collapsible articles such as articles of laundry. An additional advantage is gained from the basin-like sloping surface of the pan, as shown. An article which was placed initially on the tray 2 by the operator may have been placed angularly with respect thereto. As it slides from the tilted tray it will fall into the drop pan from its angular position. The drop pan having sloping side portions tends to straighten the article by causing it to slide toward an even position in the bottom of the pan. The pivoting of the sloping sides with a widening central opening in the bottom of the pan further tends to guide and turn the edges of the article in its drop to a position parallel to the straight inner edges of the pan side portions. Thus, although an article resting on tray 2 may be placed at any angle with respect to the margins thereof, the falling action of the article into the pan and from the pan into the bin is more or less guided to straighten it uniformly for piling in neat stacked form.

In this connection it is to be noted the sorting of articles by the machine will in normal practice begin with the larger items being handled first and finish with the smaller items. Each bin will then contain a pile of items in the general form of a pyramid. Before packaging, the items in the pile will be manually straightened and shifted to form a compact symmetrical pile for wrapping. Consequently, it will be obvious the guided movement of the article in being deposited in the collecting bin will result in less manual handling of a pile for wrapping.

Having disclosed my invention, I claim:

In a laundry sorting apparatus having an article carrying tray and means to operate the same for releasing a laundered article therefrom in an angular direction to deposit said article in a preselected receiving bin, mechanism at said receiving bin to intercept said angularly directed article and release it to drop flatwise in the bin, said mechanism comprising in combination a shallow basin having a concave trough-like surface and supports for mounting the basin directly above said receiving station and immediately below the path of a carrying tray, said basin having two complementary side portions with their inner edges, in receiving position of the basin, meeting in edge to edge relation, the outer opposite sides of said portions having a pivotal connection with said supports, means for actuating said pivotal connections to simultaneously part the inner edges of said side portions and swing said portions to hang vertically from said supports for a releasing position, said actuating means being operable in timed sequence with said carrier tray releasing means.

JAMES G. MACKECHNIE, Jr.

REFERENCES CITED

The following references are of record in the file of this patent:

UNITED STATES PATENTS

| Number | Name | Date |
| --- | --- | --- |
| 602,064 | Edison | Apr. 12, 1898 |
| 2,040,569 | Schmidt et al. | May 12, 1936 |
| 2,342,040 | Davis | Feb. 15, 1944 |